Jan. 20, 1970  R. J. BALTISBERGER  3,491,003
METHOD OF SEPARATING POLONIUM FROM IRRADIATED BISMUTH
Filed July 7, 1967

INVENTOR.
R.J. Baltisberger
BY
Roland A. Anderson
ATTORNEY

United States Patent Office 3,491,003
Patented Jan. 20, 1970

3,491,003
METHOD OF SEPARATING POLONIUM FROM IRRADIATED BISMUTH
Richard J. Baltisberger, Dayton, Ohio, assignor to the United States of America as represented by the United States Atomic Energy Commission
Filed July 7, 1967, Ser. No. 652,655
Int. Cl. C23b 5/30; B01k 1/00
U.S. Cl. 204—140    5 Claims

ABSTRACT OF THE DISCLOSURE

A process for manufacturing high purity polonium comprising irradiating bismuth, melting the resulting bismuth-polonium materials, adding a carrier constituent such as tellurium, cooling the melt and electrodepositing bismuth onto a receiving element utilizing an electrolyte containing bismuth ions, recovering the resultant polonium-carrier precipitate from the electrolyte, and separating the polonium from the carrier, as well as recovering the bismuth metal for possible further irradiation.

BACKGROUND

Polonium 210, although occurring naturally, may be manufactured by subjecting bismuth 209 to neutron irradiation. Economical irradiation within a nuclear reactor may produce 5 to 75 parts per million or higher (p.p.m.) of polonium within the bismuth. Methods for separating the polonium from the bismuth have heretofore been lengthy and difficult to carry out.

Complex chemical processes comprising numerous steps have been used to separate polonium from irradiated bismuth. However, in all of these processes the bismuth is costly to recover after the polonium has been separated, usually because the bismuth is contained in a sludge of bismuth oxychloride (BiOCl) in hydrochloric acid. Electrolysis or pyrometalurgical processes are required to recover the bismuth for reirradiation. Therefore, it often is not economical to attempt bismuth recovery.

Polonium 210 is a radioactive isotope which provides a source of alpha particles and gamma rays. It may be used as a radioisotopic heat source. Hence the usefulness of this element makes a simpler method of production desirable.

SUMMARY

It is an object of this invention to provide a method of separating polonium from irradiated bismuth by electrodepositing bismuth onto a receiving element or cathode.

It is a further object of this invention to provide a simplified method of recovering high purity bismuth in a polonium-bismuth separation process.

Various other objects and advantages will appear from the following description of the invention, and the most novel features will be particularly pointed out in the claims.

The invention comprises adding a carrier constituent to molten irradiated bismuth and thereafter forming a solid member, electrodepositing bismuth onto a receiving element or cathode from said solid member maintained as an anode, and recovering the resultant polonium-carrier precipitate, with recycling the bismuth deposited at the cathode for further irradiation if desired.

DETAILED DESCRIPTION

Figure 1:
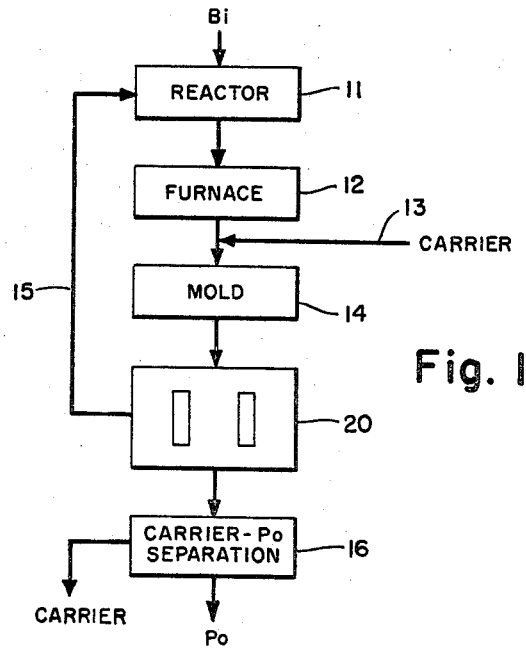
FIG. 1 is a simplified flow diagram of a process of polonium production and the novel separation method which may be employed.

A description of the invention may best be presented by reference to the flow diagram of FIG. 1. Bismuth 209 may be irradiated with neutron bombardment within a suitable nuclear reactor 11 to produce about 5 to 75 parts per million of polonium 210 within the bismuth metal. The irradiated bismuth may be then melted within a suitable furnace 12 or otherwise and sufficient carrier constituent 13 may be added and intermixed thereafter which may comprise about one to about two weight percent of the total. The melt may then be cast or formed in mold 14 for subsequent incorporation as the anode in electrolytic cell 20. During electrolysis, the bismuth may be electrodeposited onto a receiving element or cathode and may thereafter be recycled 15 for further irradiation. The polonium-carrier precipitate may be collected and the polonium separated therefrom by a suitable process 16.

The irradiation may be carried out in any nuclear reactor capable of producing a field of neutron radiation. The bismuth may be held in a metal container such as aluminum and may be removed therefrom after irradiation by cutting one or more holes in the extremities of the container which may thereafter be heated in furnace 12 to melt the bismuth-polonium materials. The materials may then be drained through the holes followed by addition thereto of the carrier constituent.

The function of the carrier constituent is to form a chemical complex with polonium which will precipitate at the anode as the bismuth is ionized. Polonium metal is electrochemically less active than bismuth, and thus, in the absence of a carrier should remain at the anode. However, the polonium is present in the irradiated bismuth to such a small extent (less than 75 p.p.m.) that it is lost in the plating bath unless a carrier is added. The carrier, by forming a complex with polonium minimizes or prevents loss of the polonium metal within the electrolyte and consequently a high recovery of both polonium and bismuth is obtainable.

The carrier selected may be any element or compound which will form an insoluble electrostable mixture with polonium. It has been found that tellurium, selenium, and mercury are all suitable carrier constituents. It is logical to assume that silver and gold, well-known coprecipitants of polonium, will likewise work although not actually tried. However, optimum results appear to be obtained with tellurium as a carrier. Hence, process specifications set out hereafter were found ideally suitable when tellurium was selected but, the operating conditions were not substantially changed when mercury or selenium were used.

Figure 2:
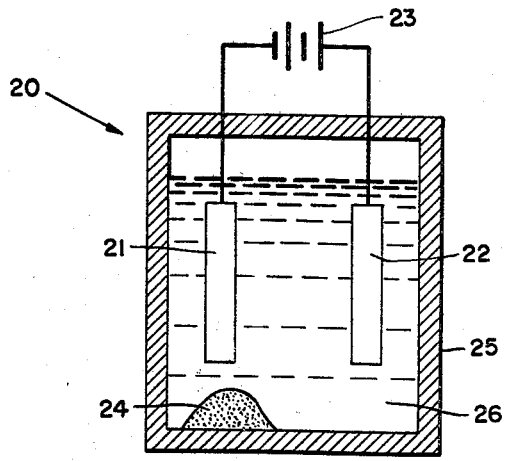
FIG. 2 is a diagrammatic representation partially in cross section of an electrolytic cell suitable for practicing the invention.

The electrolytic cell represented as 20 in FIG. 2 may comprise a container 25 holding an electrolyte 26, an anode or solid member 21 and a cathode or receiving element 22. The electrodes may be maintained at different potentials by means of an EMF source 23, such as a battery and rheostat connected in series. The polonium-carrier precipitate or sludge 24 forms beneath the anode 21 as electrolysis proceeds.

The electrolyte is preferably an aqueous solution of 6 normal HCl containing 300 grams per liter of bismuth cations. Other inorganic acids, for example HF, $H_2SO_4$, and $HNO_3$, may be used at concentrations up to 10 normal, but the bismuth cation should not be substituted to avoid alien cation contamination of the bismuth deposited at the cathode, and to provide a means of moving bismuth through the solution from the anode to the cathode.

The anode 21 is an irradiated bismuth casting alloyed with a carrier constituent. The cathode 22 is preferably made of bismuth to minimize or avoid contamination of the electrodeposited bismuth thereon with foreign cathode materials. The shape of neither electrode is critical, and may be a wire plate, sheet, ball, etc.

The electrical potential and current applied between the cell electrodes 21 and 22 should be controlled at optimum levels. Where tellurium is used the differential in electrode potential may be in the range from about 200 to about 300 millivolts. At electrode potentials in excess of 300 millivolts tellurium begins to ionize and dissolve into the electrolyte. The current flow in the tellurium application may be maintained at about 20 amperes per square foot of surface. At higher current rates, the bismuth begins to tree excessively on the cathode, and the deposit is so rough that bismuth metal may fall from the cathode. Current may be controlled at constant electrode potential by varying the distance between electrodes 21 and 22 and the ion concentration within the electrolyte 26.

During electrolysis the tellurium-polonium precipitate 24 formed at the anode or solid member 21 is generally gelatinous in nature. Normally such precipitate falls to the bottom of container 25 forming a sludge thereon, but occasionally the precipitate may tend to adhere to the anode and make mechanical scraping desirable.

After the electrolysis is completed the bismuth cathode 22 or the bismuth deposited thereon may be returned to the nuclear reactor 11 to begin another polonium production cycle. The carrier-polonium precipitate or sludge 24 may be processed to separate the polonium by a method well known in the art.

Where tellurium is used as a carrier, a number of methods may be used to recover polonium from the precipitate. The preferred method is as follows: The precipitate or sludge 24 may be dissolved in aqua-regia from which the nitric acid may be subsequently removed by reaction with formic acid. The solution thereafter may be treated with hydrazine which precipitates the tellurium in solution as a metal sludge which may be removed by filtration. Polonium, which remains dissolved in solution, may be then removed by the addition of stannous chloride to precipitate the polonium as free metal.

Sulfur dioxide has also been used as a selective reductant for precipitating tellurium from a solution of tellurium and polonium.

Prior methods for recovery of polonium result in a waste solution of bismuth dissolved in hydrochloric acid. Subsequent recovery of the bismuth would require either an additional electrolysis process or pyrometallurgical process. In the described invention the bismuth is recovered in the same step in which the polonium is removed which results in considerable saving in cycle time and the elimination of extra process steps.

The described invention provides a new method for separating polonium from irradiated bismuth which is a substantial improvement over the prior art. Polonium and bismuth of about 99% purity can be easily recovered by use of simple inexpensive equipment. In each cycle, about 95% of the polonium produced and about 90% of the bismuth introduced are recoverable. Process time for 1 pound of irradiated bismuth containing up to 75 p.p.m. polonium is only about 2 days as compared to 5 days required by the prior art chemical recovery processes. Furthermore, the flexibility of this new method affords a wide range of operating conditions having relatively foolproof operation.

It will be understood that various changes in the details, reagents and arrangement of process steps, which have been herein described and illustrated in order to explain the nature of the invention, may be made by those skilled in the art within the principles and scope of the invention as expressed in the appended claims.

What is claimed is:
1. The method of separating polonium from bismuth which has been irradiated, comprising heating the materials bismuth and polonium to molten condition; adding to said materials while molten about one to about two weight percent of a carrier constituent selected from the elements tellurium, selenium, silver, gold, and mercury; cooling said materials and said added metal carrier to form a solid member; placing the member in an acid solution containing bismuth; inserting an element into said solution at a location spaced from said member; connecting said member and element to a source of current to electrodeposit bismuth from the member onto said element and effect precipitation of polonium and the added carrier constituent as a sludge; and thereafter separating polonium from said added carrier constituent.

2. The method according to claim 1 whereby said element inserted into the solution at a location spaced apart from said member consists of bismuth.

3. The method according to claim 1 whereby said source of current connected to the element and member includes means to control the output voltage and current therefrom.

4. The method according to claim 1 in combination with the additional step comprising recycling the bismuth electrodeposited on said element to a means for reirradiation and subsequent reprocessing in accordance with the improved method claimed in claim 1.

5. The method according to claim 1 whereby the carrier constituent consists of tellurium.

References Cited

UNITED STATES PATENTS 2,872,394  2/1959  Newman _____ 204—105

OTHER REFERENCES

Chem. of Rare Radioelements, Bagdall, Academic Press Inc. (1957).

DANIEL E. WYMAN, Primary Examiner

PHILIP M. FRENCH, Assistant Examiner

U.S. Cl. X.R.

204—105, 146